July 18, 1961  J. HENDRICKSON  2,992,663
SAW GUIDE FOR BAND SAWS
Filed Dec. 24, 1959  3 Sheets-Sheet 1
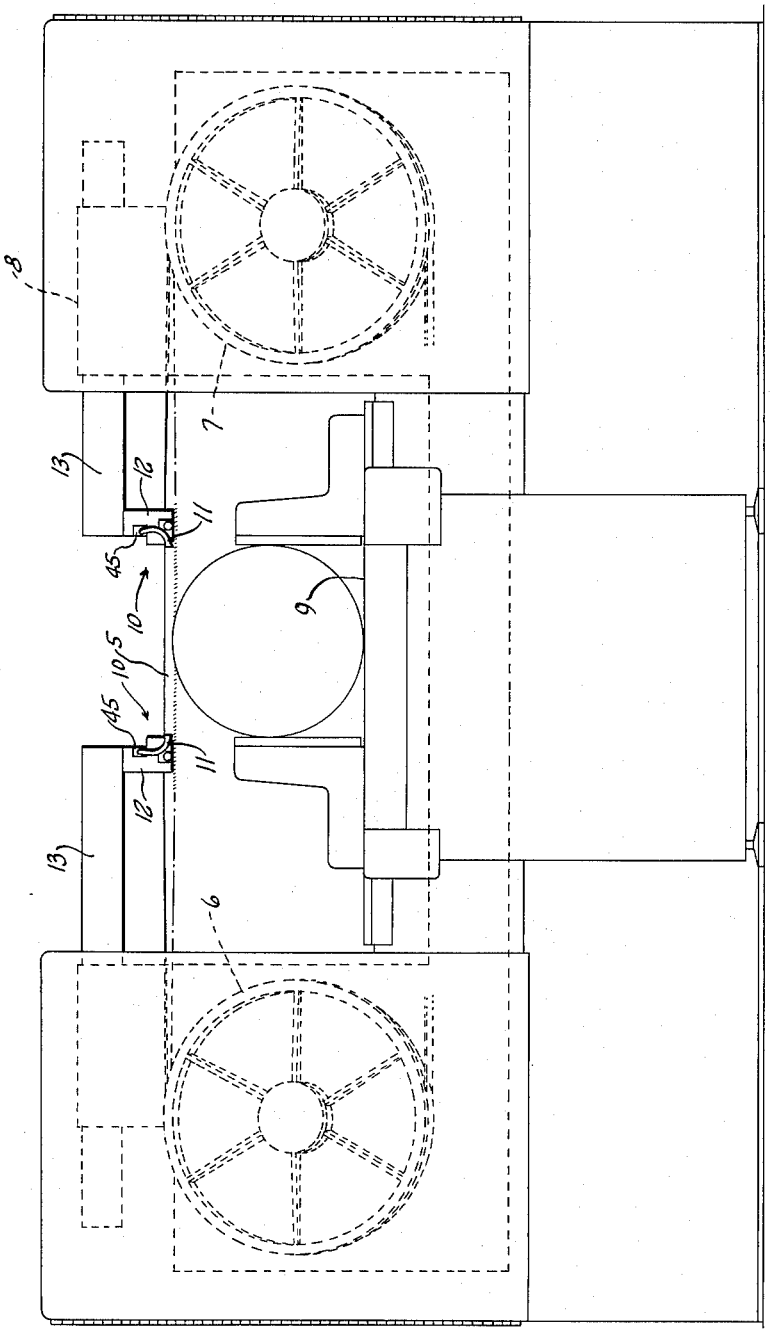
Inventor
Jack Hendrickson

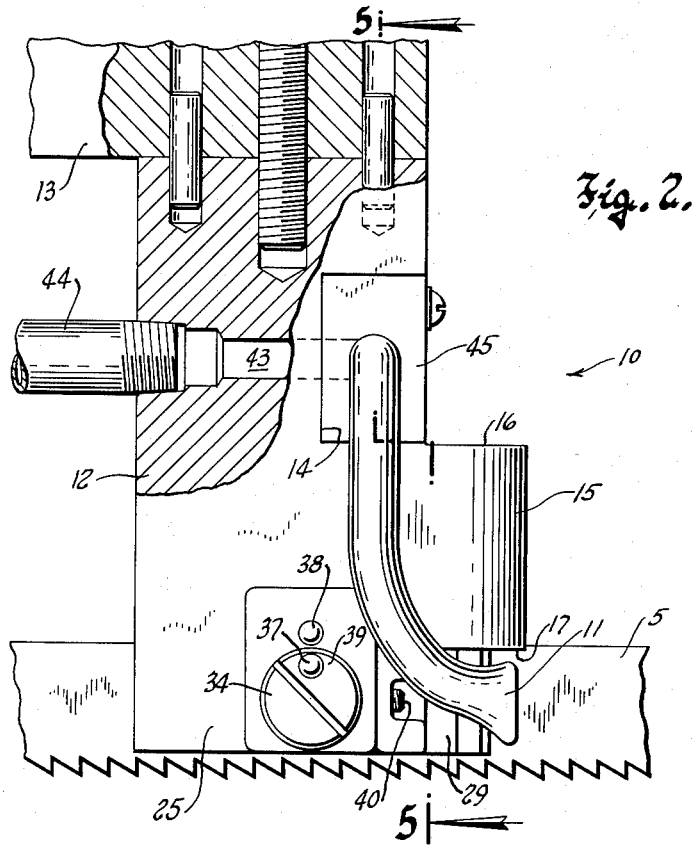
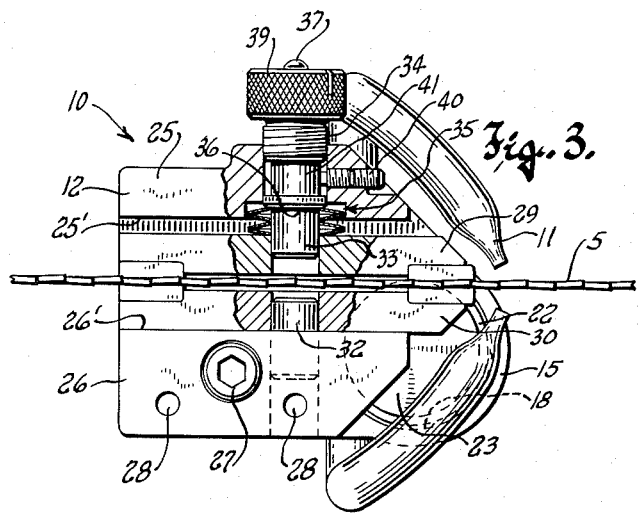

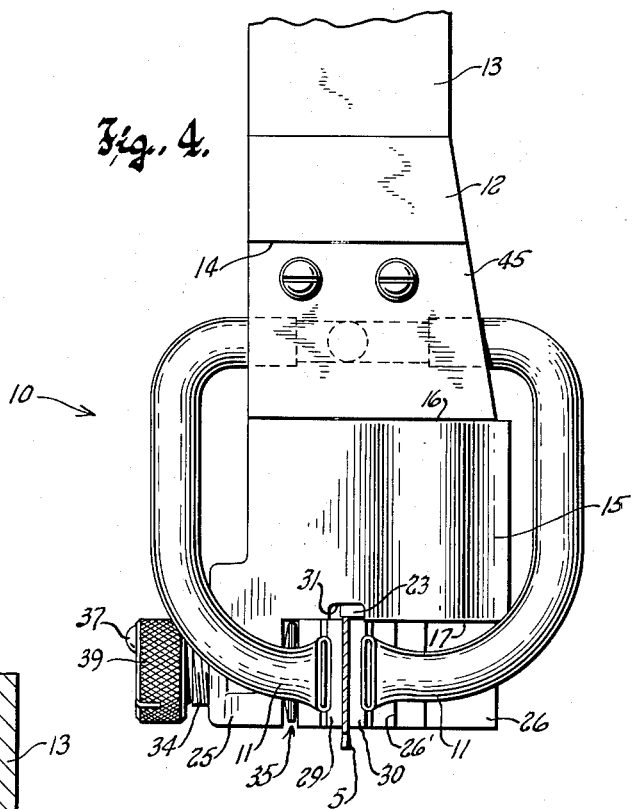
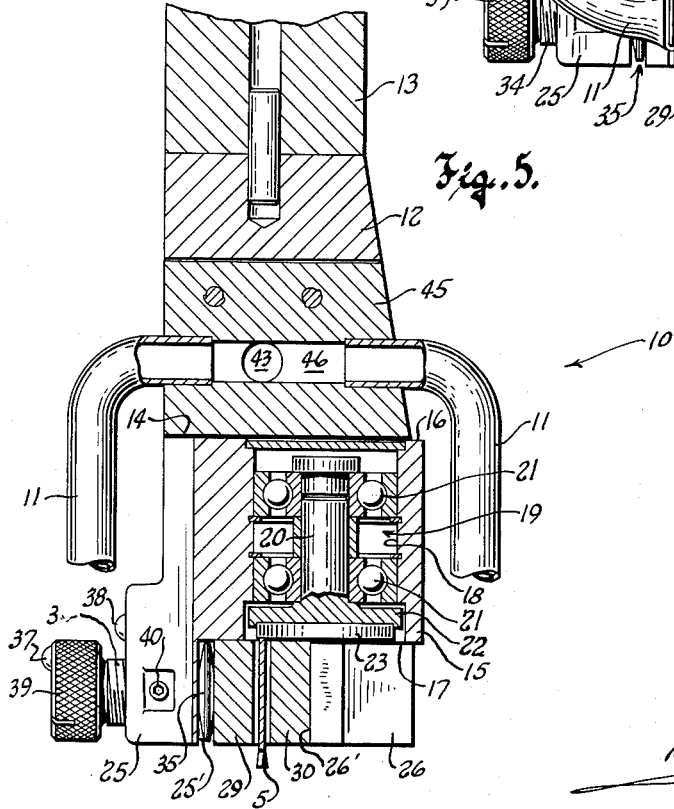

United States Patent Office 2,992,663
Patented July 18, 1961

2,992,663
SAW GUIDE FOR BAND SAWS
Jack Hendrickson, Hopkins, Minn., assignor to Continental Machines, Inc., Savage, Minn., a corporation of Minnesota
Filed Dec. 24, 1959, Ser. No. 861,812
5 Claims. (Cl. 143—166)

This invention relates generally to band saws and refers more particularly to the guides of a band saw by which the saw band or blade is held and guided for travel through the cutting zone of the machine. These guides are located at opposite ends of the cutting zone and supportingly engage the band or blade at its back edge as well as at both sides thereof.

Heretofore, the saw band guides employed in band saws and cut-off saws to prevent sideward motion of the band have usually comprised fixed opposed shoes having flat surfaces which engaged the side faces of the band as it traveled lengthwise between them. While such guides were reasonably satisfactory for ordinary cut-off and sawing work, they could not guide the band with the accuracy required for finer machining operations because a saw band inevitably has slight variations in thickness along its length. If the spacing between the guide shoes was adjusted to the maximum thickness of the band, then as the thinner portions of the band pased between the shoes the band would not be firmly held against sideward movement or vibration, while adjustment of the shoes to the minimum band thickness caused noticeable binding of the band as its localized areas of greater thickness traversed the gap between the shoes, resulting in variations of the linear speed of the band.

With the foregoing in mind, it is an object of this invention to provide guide means for the saw band of a band saw, cut-off saw or the like, which comprises a pair of opposing guide members or shoes having surfaces which slidingly engage the opposite faces of the band, wherein the spacing between the shoes is constantly and automatically adjusted to accommodate variations in thickness of the band as it passes between the shoes, thereby insuring that both shoes will at all times have guiding engagement with the side surfaces of the band, to afford optimum cutting accuracy without causing variations in the linear speed of the band.

This is also the general purpose of the invention which forms the subject matter of the copending application of Harvey A. Chapman et al., Serial No. 707,967, now Patent No. 2,934,106.

The function performed by the saw guides is especially important in the case of band-type cutoff saws of the type forming the subject matter of Patent No. 2,898,669. In these machines, the pulleys which carry the band lie in a plane which is more vertical than horizontal (the axes of the wheels approaching horizontal). Hence, the cutting stretch of the saw band must be twisted to dispose the same in a vertical plane as it passes through the cutting zone. Needless to say, for the saw guides to perform this function, they must grip the sides of the band quite firmly, but it has been found that the operators of cut-off saws are very reluctant to adjust the guide shoes into sufficiently tight engagement with the band to obtain best results, probably because they fear that they will tighten the shoes excessively and cause them to gall or bind the saw band.

It is, therefore, another object of this invention to provide means in a cut-off saw or the like for automatically maintaining the guide shoes for the saw band in snug sliding engagement with the band, to thereby assure optimum results without any necessity for manual adjustment.

In the aforesaid copending application, now Patent No. 2,934,106, this objection is overcome by having one of the guide shoes yieldingly urged toward the other by hydraulic pressure. While the use of hydraulic pressure for this purpose produced good results, the cost thereof precluded the adoption of this feature on the lower priced machines which account for the largest portion of the band type cut-off saws sold. It is, therefore, the purpose of this invention to provide a saw guide which retains the advantage of the hydraulic pressure loaded saw guides of Patent No. 2,934,106, but which is far less costly.

With this general objective in mind, it is a further object of this invention to provide a saw guide in which spring means are employed to yieldingly urge the guide shoes toward one another, and with a view toward assuring the attainment of a predetermined spring pressure, it is a further object of this invention to provide simple indicator means by which an operator can accurately predetermine the tension in the spring and set it for a given nominal band thickness.

Cut-off saws of the type referred to are, of necessity, provided with means to apply a liquid coolant to the band as it enters the work zone, and to assure that the coolant will be properly applied, this invention has as another of its objects to combine the coolant applicator, the backup against which the back edge of the saw bears, and the saw guide, all in one compact unit, with the applicator in predetermined fixed relation to the rest of the structure.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

FIGURE 1 is a front view of a cutoff saw of the type forming the subject matter of Patent No. 2,898,669, equipped with the saw guides of this invention;

FIGURE 2 is a front view of the left-hand saw guide at an enlarged scale;

FIGURE 3 is a bottom view of the left-hand saw guide, with parts broken away and shown in section;

FIGURE 4 is an end view of the saw guide; and

FIGURE 5 is a cross sectional view on the plane of the line 5—5 in FIGURE 2.

Referring now particularly to the accompanying drawings in which like numerals indicate like parts throughout the several views, it will be seen that the invention has been illustrated in connection with a cutoff saw wherein an endless saw band or blade 5 is trained about pulleys 6 and 7 carried by a movable saw head or frame 8. The head or frame 8 is mounted for translatory vertical motion to carry the cutting stretch of the saw band or blade, which in this machine is the top stretch, downward towards a work support 9 on the base of the machine. Hence, during operation of the machine, the cutting stretch of the band or blade which moves from left to right through the cutting or work zone of the machine, as viewed in FIGURE 1, cuts through work on the work support 9.

Since the saw band or blade must have its cutting stretch disposed in a vertical plane as it passes through the work zone, and since the axes of the pulleys 6 and 7 are more nearly horizontal than vertical, it is necessary that the cutting stretch of the saw band be twisted as it enters and leaves the work zone. It is, of course, also essential that the cutting stretch of the band or blade be held as firmly as possible against deviation from its proper vertically disposed position.

The twisting of the band or blade and the holding thereof in its proper position is the function of the saw guides which form the subject matter of this invention, and which are indicated generally by the numeral 10. As shown in FIGURE 1, one of these saw guides is located at the entrance of the band into the work zone, and the other is located where the band leaves the work zone. The two saw guides may be duplicates of one another or they may be paired, i.e. left and right-hand, one mirroring the other.

In addition to twisting the saw band or blade and guiding it, the guide units 10 also have means for applying liquid coolant to the band directly before it enters the work and as it leaves the work, and for this purpose the guides 10 are equipped with nozzles 11 from which the liquid coolant spews to envelope the saw band or blade as it passes. Each guide structure has two such coolant applicator nozzles with their discharge mouths facing one another and the band travelling therebetween. The details of these coolant applicator nozzles will be described hereinafter suffice it to say at this point that the nozzles of the left-hand guide unit direct the coolant onto the saw band just before it enters the work and in a manner to assure optimum cutting, and that the nozzles of the right-hand guide unit project their streams of coolant onto the saw band as it leaves the work, to cool the band and flush away chips.

Each guide unit comprises a rigid bracket having a body 12, securely fixed to and depending from an arm 13 which is longitudinally adjustably mounted in the frame 9, to enable the guide unit to be adjusted along the length of the cutting stretch of the band or blade. A rather deep, large recess or notch 14 opening to one side of the body defines a lateral boss 15 having parallel top and bottom surfaces 16 and 17, respectively. A bore 18 extends vertically through this boss, opening to its surfaces 16 and 17, and mounted in this bore is a backup bearing 19. This backup bearing comprises a spindle 20 freely rotatably journalled in the bore 18 by a pair of ball bearings 21 suitably mounted in the bore and held against endwise displacement therein. At its bottom end the spindle has a flange 22 which substantially closes the adjacent end of the bore 18, and has a hardened steel cover or plate 23 secured to its underside to provide the surface of the backup against which the back edge of the saw band bears.

Projecting down from the bottom of the body are two spaced flanges or projections 25 ad 26, the former being an integral part of the body and being located entirely to one side of the bore 18 and the backup bearing therein. The other flange or projection 26 is a separate part attached to the underside of the body by a screw 27 and accurately positioned thereon by dowel pins 28. One end of this flange or projection 26 underlies the backup bearing and, in fact, has that end thereof closely adjacent to its center of rotation. The opposing inner faces 25' and 26' of the flanges or projections 25 and 26, respectively, are flat and parallel to one another.

By virtue of its downwardly projecting flanges or projections 25 and 26, the bottom end of the body 12 may be said to be bifurcated, and mounted in the space between the bifurcations, i.e. the flanges or projections 25 and 26, are two complementary guide shoes 29 and 30. The shoe 30 is mounted on the flange or projection 26, and the shoe 29 is movably mounted from the flange or projection 25.

At their opposite ends, the guide shoes 29 and 30 have carbide wear pads or facings which slidingly engage the opposite sides of the saw band and constrain the same to travel along a path which intersects the hardened underside of the backup bearing at a substantial distance from the axis of the bearing, so that the bearing rotates as it performs its function of carrying the thrust imposed upon the saw band by the work.

Since it is desirable to have the underside of the backup bearing substantially flush with the bottom surface 17 of the body 12, a groove 31 is formed in the bottom surface 17 to accommodate the back edge of the band and enable it to bear against the underside of the backup bearing. Obviously, the groove 31 aligns with the inner faces of the guide shoes, and extends fully across the surface 17.

The guide shoes are identical and, hence, may be used interchangeably. Both are readily removably held in position by pins which project perpendicularly from the inner faces of the flanges or projections 25 and 26 and enter holes in the shoes. The pin 32 which holds the shoe 30 is fixed in the flange or projection 26 and projects from its inner face 26'; and the pin 33 which holds the shoe 29 is the smooth unthreaded inner end of a screw 34 threaded into the flange or projection 25 coaxially with the pin 32. The holes in the guide shoes into which the pin 32 and the smooth end 33 of the screw project, are so located with respect to the upper and lower edges of the guide shoes that in each case the upwardly facing edge of the shoe flatwise engages the adjacent bottom surface 17 of the body and holds the guide shoe against rocking about its pin.

For all practical purposes, the guide shoe 30 may be regarded as fixed or stationary, since in its operative position it not only is held against rocking about the pin 32, but it also seats squarely upon the inner face 26' of the flange or projection 26.

The other guide shoe 29, however, is movable toward and from the stationary shoe 30, so that the shoes may be said to be mounted for relative movement towards one another. Not only is the shoe 29 movable as described, but it also is yieldingly urged toward the guide shoe 30 by spring means 35 in the form of four dished spring washers. These washers are interposed between the outer face of the shoe 29 and a shoulder 36 on the screw at the junction of its smooth inner end 33 and its threaded outer portion, and to afford adequate space for the spring washers, the flange or projection 25 has a socket opening to its inner face and formed as a counterbore to the threaded bore in which the screw is received.

It follows, therefore, that the force with which the spring washers urge the movable shoe 29 toward the stationary shoe, depends upon the extent to which the screw 34 is threaded into the flange or projection 25. While the determination of this matter might be left to the discretion of the operator, it is better to determine the optimum spring setting at the factory and provide means by which the same setting may be quickly and easily duplicated by the operator every time the band is replaced. For this purpose, a pair of indicator buttons or knobs 37 and 38 are secured to the head 39 of the screw and the adjacent face of the body. Both of these buttons or knobs may be simply the heads of ordinary drive screws or pins. The screw or pin which provides the knob or button 38 is first driven into the body at its desired location and then, with the screw turned down to the point at which the movable shoe 29 is in contact with the stationary shoe 30, the hole for the drive screw or pin which provides the button or knob 37 is drilled into the head of the screw in line with or directly opposite the knob 38, following which this drive screw or pin is driven into place.

The spring washers 35 are so designed and tensioned that they will provide the proper gripping force on the band when the buttons or knobs 37 and 38 are re-matched or re-aligned after inserting the saw blade between the guide shoes.

It follows, therefore, that the establishment of the correct grip upon the band is a simple matter.

To preclude detachment of the screw 34 from the body, a set screw 40 threaded into the body has its inner end projecting into an annular groove 41 in the threaded portion of the screw, the groove being wide enough to accommodate the needed axial travel of the screw.

As noted hereinbefore, in addition to guiding the saw band or blade in a manner which will assure the maintenance of its cutting portion in the desired true vertical plane, it is also important and essential that liquid coolant be applied to the blade in a proper manner and in a way which is positively coordinated with the guiding function obtained by the guide shoes and backup. To assure this result, the coolant applicator nozzles 11 are carried by and, in fact, mounted upon the body 12 of the saw guide structure.

To this end, the body 12 has a bore 43 extending from the bottom of its recess 14 back to the opposite side of the body where a supply line 44 is attached, the line 44 leading from a suitable source of liquid coolant under pressure. A block 45 secured in the recess 14 over the mouth of the bore 43 has a branched coolant passage 46 therein, which leads from the bore 43 with which its inlet end aligns, to a pair of outlet ports in which the tubes that form the actual nozzles 11 are secured. These tubes are bent to extend downwardly in embracing relation to the boss 15 with their lower discharge ends disposed directly beneath the boss and contiguous to the adjacent ends of the guide shoes. The discharge ends of the tubes are flattened as shown to provide slit-like orifices which extend parallel to the opposite faces of the saw blade and face one another to spew the coolant onto the blade across its full width and also onto its toothed lower edge.

From the foregoing description taken in connection with the accompanying drawings, it will be readily apparent to those skilled in this art that this invention provides a saw guide unit for band saws and cutoff saws using endless saw bands or blades, which possesses many important advantages over those heretofore available. Attention is particularly directed to the ease with which the adjustment of the clamping force is effected to assure correct pressure upon the saw blade at all times; and also to the fact that by the incorporation of the coolant applicator nozzle means as part of the saw guide structure, the required relationship between the coolant applicator and saw guidance is assured.

What is claimed as my invention is:

1. A saw guide for band saws comprising: a rigid supporting member having spaced parallel flanges; a pair of guide shoes between the two flanges adapted to engage the opposite sides of a saw band, one of said shoes being stationary and the other being movable toward and from the stationary shoe; means mounting the stationary guide shoe upon the supporting member in a position seated upon the inner face of one of the flanges; pin means projecting inwardly from the inner face of the other flange and into a hole in the movable shoe to hold the movable shoe in place in a manner allowing bodily movement thereof towards and from the stationary shoe; spring means bearing upon the movable shoe and yieldingly urging the same toward the stationary shoe; screw means reacting between said other flange and the spring means operable upon rotation to adjust the tension of the spring means and thereby set the force with which the spring means acts upon the movable shoe to clamp a saw blade between the two guide shoes; and cooperating indicating means on the screw means and the supporting member to facilitate establishing a predetermined tension in the spring means.

2. A saw guide for band saws comprising: a rigid supporting member having spaced parallel flanges; a pair of guide shoes between the two flanges adapted to engage the opposite sides of a saw band, one of said shoes being stationary and the other being movable toward and from the stationary shoe; means mounting the stationary guide shoe upon the supporting member in a position seated upon the inner face of one of the flanges; a screw threaded in the other flange with its axis perpendicular to the inner faces of the two flanges; a smooth end portion on the screw projecting beyond the inner face of the flange in which the screw is threaded; the movable guide shoe having a hole into which the smooth end portion of the screw projects, said hole being so located that the entry of the smooth end portion of the screw in the hole coacts with surfaces of the supporting member with which the movable guide shoe engages, to hold the movable guide shoe directly opposite the stationary shoe; a shoulder on the screw facing the movable guide shoe; and a compression spring encircling the smooth end portion of the screw and confined between said shoulder and the movable guide shoe to yieldingly urge the latter toward the stationary shoe with a force depending upon the extent the screw is threaded into the flange in which it is mounted.

3. The saw guide of claim 2, wherein the mounting of the stationary guide shoe comprises a pin fixed in the flange upon which said guide shoe is seated, coaxial with the screw and projecting perpendicularly from the inner face of said flange and entering a hole in the stationary guide shoe, said hole being of the same size as the hole in the movable guide shoe into which the smooth end portion of the screw projects, and being similarly located so that the two guide shoes are interchangeable.

4. The guide shoe of claim 2, wherein the compression spring comprises a plurality of dished spring washers; and further characterized by the provision of cooperating indicator means on the outer end of the screw and the adjacent portion of the supporting member which, upon alignment, indicate a predetermined degree of tension in the spring washers.

5. A guide for the blade of a saw band comprising: a rigid supporting member; a pair of guide shoes having substantially coextensive opposing blade engaging faces to engage the opposite sides of the blade, said blade engaging faces being elongated in the direction of blade travel therebetween and having wear resistant surfaces at the ends thereof upon which the blade rides, one of said guide shoes being stationary and the other being movable toward and from the stationary shoe; means readily detachably mounting the stationary guide shoe on the supporting member in fixed relation thereto; cooperating locating means on the supporting member and the movable guide shoe detachably holding the movable guide shoe in position opposite the stationary shoe and in a manner permitting the movable shoe to move toward and from the stationary shoe; spring means bearing upon the movable shoe at a point substantially medially of the upstream and downstream ends of its blade engaging face, to urge the movable shoe toward the stationary shoe; spring adjusting screw means threaded in the supporting member and acting upon said spring means to adjust the tension thereof; and cooperating indicating means on the supporting member and the screw means whereby a predetermined known spring tension may be quickly and repeatedly obtained.

References Cited in the file of this patent

UNITED STATES PATENTS

| | | |
|---|---|---|
| 1,421,107 | Stowell | June 27, 1922 |
| 2,684,697 | Ferrari | July 27, 1954 |
| 2,815,562 | Wilkie et al. | Dec. 10, 1957 |
| 2,934,106 | Chapman et al. | Apr. 26, 1960 |